United States Patent
Amman et al.

(10) Patent No.: US 11,355,136 B1
(45) Date of Patent: Jun. 7, 2022

(54) SPEECH FILTERING IN A VEHICLE

(71) Applicant: Ford Global Technologies, LLC, Dearborn, MI (US)

(72) Inventors: Scott Andrew Amman, Milford, MI (US); Cynthia M. Neubecker, Westland, MI (US); Pietro Buttolo, Dearborn Heights, MI (US); Joshua Wheeler, Trenton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/145,437

(22) Filed: Jan. 11, 2021

(51) Int. Cl.
| | |
|---|---|
| *G10L 21/0364* | (2013.01) |
| *G10L 21/0308* | (2013.01) |
| *G10L 15/20* | (2006.01) |
| *H04M 3/22* | (2006.01) |
| *G10L 17/24* | (2013.01) |
| *B60K 37/02* | (2006.01) |

(52) U.S. Cl.
CPC .......... *G10L 21/0364* (2013.01); *G10L 15/20* (2013.01); *G10L 17/24* (2013.01); *G10L 21/0308* (2013.01); *H04M 3/2236* (2013.01); *B60K 37/02* (2013.01); *B60K 2370/148* (2019.05)

(58) Field of Classification Search
None
See application file for complete search history.

(56) References Cited

U.S. PATENT DOCUMENTS

| | | | | |
|---|---|---|---|---|
| 9,431,013 | B2* | 8/2016 | Reuter | G10L 15/20 |
| 9,516,414 | B2 | 12/2016 | Hansson et al. | |
| 2009/0055180 | A1* | 2/2009 | Coon | B60R 16/0373 704/251 |
| 2009/0287489 | A1* | 11/2009 | Savant | G10L 21/0364 704/E15.001 |
| 2011/0125500 | A1* | 5/2011 | Talwar | G10L 17/26 704/251 |
| 2013/0185078 | A1* | 7/2013 | Tzirkel-Hancock | G10L 15/22 704/275 |
| 2016/0012827 | A1* | 1/2016 | Alves | H04R 3/005 381/71.1 |
| 2016/0029111 | A1* | 1/2016 | Wacquant | H04R 3/005 381/71.4 |
| 2016/0039356 | A1* | 2/2016 | Talwar | H04R 3/005 381/86 |
| 2017/0032806 | A1* | 2/2017 | Konjeti | G10L 25/84 |

(Continued)

FOREIGN PATENT DOCUMENTS

KR 20160031847 A 3/2016

*Primary Examiner* — Shaun Roberts
(74) *Attorney, Agent, or Firm* — Frank Lollo; Bejin Bieneman PLC

(57) ABSTRACT

A computer includes a processor and a memory storing instructions executable by the processor to identify an occupant in a passenger cabin of a vehicle, detect a position of a head of the occupant relative to the passenger cabin, apply a first filter to speech from the occupant based on the position of the head, generate a second filter, apply the second filter to the speech, adjust the second filter based on a difference between the speech of the occupant filtered by the second filter and a prestored profile of the occupant, and perform an operation using the speech filtered by the first filter and the second filter.

17 Claims, 6 Drawing Sheets

(56) References Cited

U.S. PATENT DOCUMENTS

| | | | |
|---|---|---|---|
| 2017/0150256 A1* | 5/2017 | Christoph | H04R 3/005 |
| 2017/0323644 A1* | 11/2017 | Kawato | G10L 17/00 |
| 2018/0332389 A1* | 11/2018 | Ekkizogloy | G10L 15/26 |
| 2019/0080710 A1* | 3/2019 | Zhang | G10L 25/03 |
| 2019/0122689 A1* | 4/2019 | Jain | H04R 3/005 |
| 2019/0370443 A1* | 12/2019 | Lesso | G10L 25/51 |
| 2019/0392852 A1* | 12/2019 | Hijazi | G10L 17/18 |
| 2020/0037073 A1* | 1/2020 | Augst | G06F 3/017 |
| 2020/0241834 A1* | 7/2020 | Boeen | H04R 1/1041 |
| 2020/0320992 A1 | 10/2020 | Yamasaki et al. | |

* cited by examiner

SPEECH FILTERING IN A VEHICLE

BACKGROUND

Many modern vehicles include voice-recognition systems. Such a system includes a microphone. The system converts spoken words detected by the microphone into text or another form to which a command can be matched. Recognized commands can include adjusting climate controls, selecting media to play, etc.

DETAILED DESCRIPTION

Figure 1:
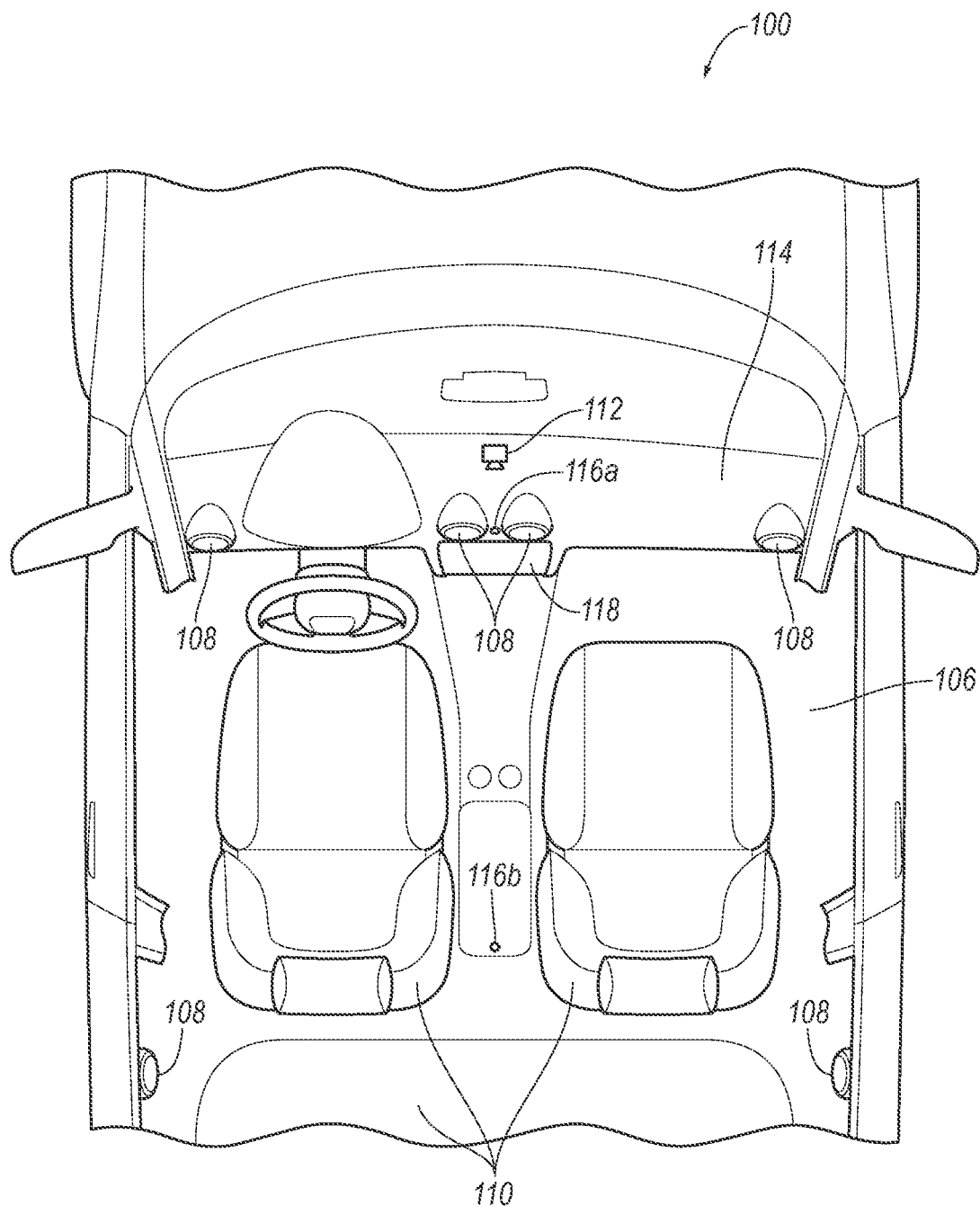
FIG. 1 is a top view of an example vehicle with a passenger cabin exposed for illustration.

A computer includes a processor and a memory storing instructions executable by the processor to identify an occupant in a passenger cabin of a vehicle, detect a position of a head of the occupant relative to the passenger cabin, apply a first filter to speech from the occupant based on the position of the head, generate a second filter, apply the second filter to the speech, adjust the second filter based on a difference between the speech of the occupant filtered by the second filter and a prestored profile of the occupant, and perform an operation using the speech filtered by the first filter and the second filter.

The instructions may include instructions to, repeatedly during a single trip of the vehicle, detect the speech by the occupant, then apply the second filter to the speech, and then adjust the second filter based on the difference between the speech filtered by the second filter and the prestored profile.

The second filter may be a pass-through filter when generated.

Generating the second filter may occur in response to the speech differing from the prestored profile by at least a nonzero threshold. The instructions may include instructions to, in response to the speech differing from the prestored profile by less than the nonzero threshold, perform the operation using the speech filtered by the first filter.

The prestored profile may include a plurality of sound levels at a respective plurality of frequencies, and the speech may differ from the prestored profile by at least the nonzero threshold when at least one of the sound levels in the prestored profile differs from a sound level of the speech at the same frequency by at least a nonzero sound-level threshold.

The instructions to apply the first filter may include instructions to select the first filter according to the position of the head from a plurality of filters stored in memory.

The instructions may include instructions to generate the prestored profile based on a recording of speech by the occupant. The instructions may include instructions to provide a prompt to the occupant to say prestored text, and to make the recording of the speech while the occupant says the prestored text.

The instructions to apply the second filter to the speech may include instructions to apply the second filter to the speech filtered by the first filter.

The second filter may adjust sound levels of the speech by an amount that varies depending on frequency.

The first filter may adjust sound levels of the speech by an amount that varies depending on frequency.

The operation may be identifying a voice command to activate a feature.

The operation may be transmitting the speech filtered by the first filter and the second filter in a telephone call.

The operation may be outputting the speech filtered by the first filter and the second filter by a speaker of the vehicle.

A method includes identifying an occupant in a passenger cabin of a vehicle, detecting a position of a head of the occupant relative to the passenger cabin, applying a first filter to speech from the occupant based on the position of the head, generating a second filter, applying the second filter to the speech, adjusting the second filter based on a difference between the speech of the occupant filtered by the second filter and a prestored profile of the occupant, and performing an operation using the speech filtered by the first filter and the second filter.

The method may further include, repeatedly during a single trip of the vehicle, detecting the speech by the occupant, then applying the second filter to the speech, and then adjusting the second filter based on the difference between the speech filtered by the second filter and the prestored profile.

The second filter may be a pass-through filter when generated.

Generating the second filter may occur in response to the speech differing from the prestored profile by at least a nonzero threshold.

Applying the first filter may include selecting the first filter according to the position of the head from a plurality of filters stored in memory.

With reference to the Figures, a computer 102 includes a processor and a memory storing instructions executable by the processor to identify an occupant in a passenger cabin 106 of a vehicle 100, detect a position of a head of the occupant relative to the passenger cabin 106, apply a first filter to speech from the occupant based on the position of the head, generate a second filter, apply the second filter to the speech, adjust the second filter based on a difference between the speech of the occupant filtered by the second filter and a prestored profile 104 of the occupant, and perform an operation using the speech filtered by the first filter and the second filter.

The computer 102 can be used to boost the clarity of speech from an occupant who is experiencing a condition that alters their voice, e.g., the occupant is sick, is wearing a mask, etc. The choice of the first filter can compensate for some effects to the occupant's voice from the occupant's position because those effects are constant across occupants. The second filter can be adjusted to compensate for the occupant's specific condition. The filtered sound data can thus reliably be used for various in-vehicle operations such as providing a voice command to activate a feature of the vehicle 100, or providing speech to be transmitted in a telephone call, or providing speech to a speaker 108 elsewhere in the vehicle 100, i.e., to an in-vehicle intercom system. The voice command can be reliably recognized, the telephone call can be reliably understood by the person at the other end from the occupant, and the intercom message can be reliably understood by the other occupant of the vehicle 100. Further, the prestored profile 104 can be used on multiple vehicles without needing to re-create the prestored profile 104 for each vehicle.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc. The vehicle 100, for example, may be autonomous. In other words, the vehicle 100 may be autonomously operated such that the vehicle 100 may be driven without constant attention from a driver, i.e., the vehicle 100 may be self-driving without human input.

The vehicle 100 includes the passenger cabin 106 to house occupants of the vehicle 100. The passenger cabin 106 includes seats 110 including one or more front seats 110 disposed at a front of the passenger cabin 106 and one or more back seats 110 disposed behind the front seats 110. The passenger cabin 106 may also include third-row seats 110 (not shown) at a rear of the passenger cabin 106.

The vehicle 100 includes at least one camera 112. The camera 112 can detect electromagnetic radiation in some range of wavelengths. For example, the camera 112 may detect visible light, infrared radiation, ultraviolet light, or some range of wavelengths including visible, infrared, and/or ultraviolet light. For example, the camera 112 can be a thermal imaging camera.

The camera 112 is positioned so that a field of view of the camera 112 encompasses at least one of the seats 110, e.g., the driver seat 110, or the front and back seats 110. For example, the camera 112 can be positioned on an instrument panel 114 or rear-view mirror and oriented rearward relative to the passenger cabin 106.

The vehicle 100 includes at least one microphone 116, e.g., a first microphone 116a and a second microphone 116b. The microphones 116 are transducers that convert sound into an electrical signal. The microphones 116 can be any suitable type of microphones 116 for detecting speech by occupants of the vehicle 100, e.g., dynamic, condenser, contact, etc.

The microphones 116 can be arranged at respective locations or positions in the passenger cabin 106 to collectively detect speech from occupants in different seats 110. For example, the first microphone 116a can be positioned in the instrument panel 114, and the second microphone 116b can be positioned between the front seats 110 and oriented to pick up sound from the back seats 110.

A user interface 118 presents information to and receives information from an occupant of the vehicle 100. The user interface 118 may be located, e.g., on the instrument panel 114 in the passenger cabin 106, or wherever it may be readily seen by the occupant. The user interface 118 may include dials, digital readouts, screens, the speakers 108, and so on for providing information to the occupant, e.g., human-machine interface (HMI) elements such as are known. The user interface 118 may include buttons, knobs, keypads, the microphones 116, and so on for receiving information from the occupant.

The speakers 108 are electroacoustic transducers that convert an electrical signal into sound. The speakers 108 can be any suitable type for producing sound audible to the occupants, e.g., dynamic. The speakers 108 can be arranged at respective locations or positions in the passenger cabin 106 to collectively produce sound for occupants in respective seats 110.

Figure 2:
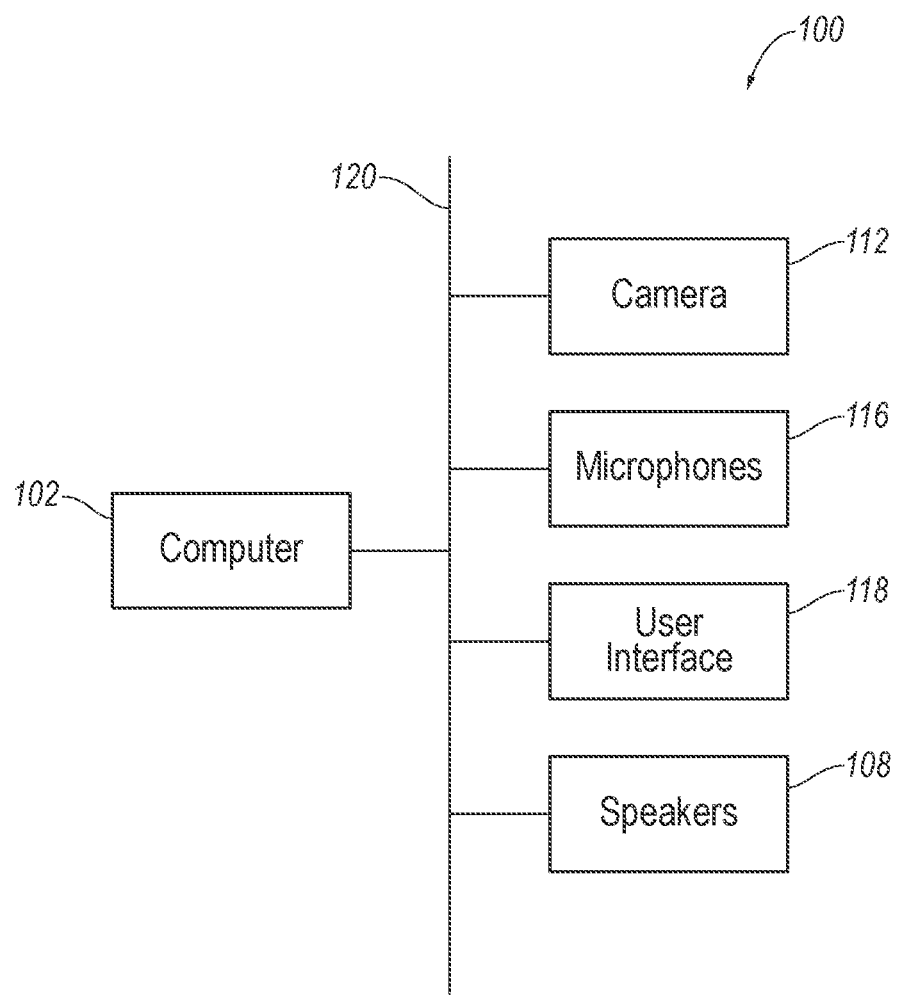
FIG. 2 is a block diagram of a system of the vehicle.

With reference to FIG. 2, the computer 102 is a microprocessor-based computing device, e.g., a generic computing device including a processor and a memory, an electronic controller or the like, a field-programmable gate array (FPGA), an application-specific integrated circuit (ASIC), etc. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 120 such as a controller area network (CAN) bus, Ethernet, WiFi®, Local Interconnect Network (LIN), onboard diagnostics connector (OBD-II), and/or by any other wired or wireless communications network. The computer 102 may be communicatively coupled to the camera 112, the microphones 116, the user interface 118, the speakers 108, and other components via the communications network 120.

Figure 3:
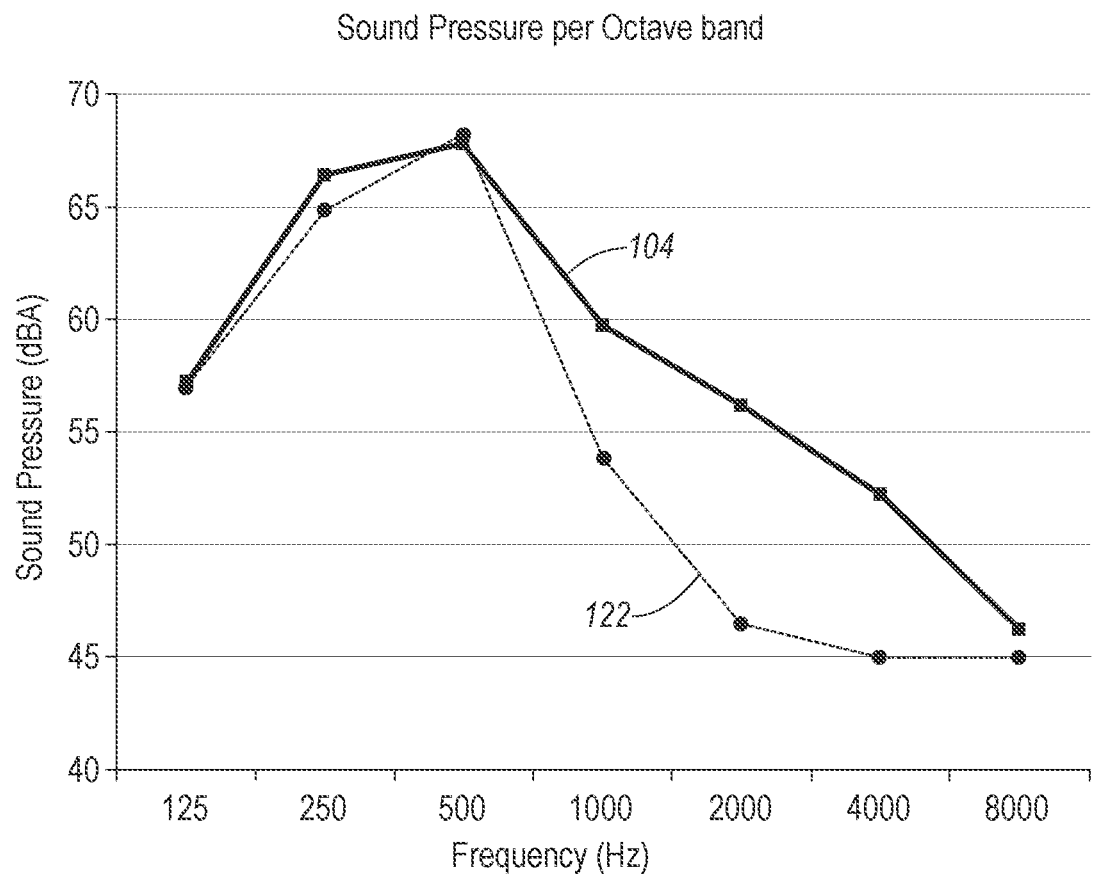
FIG. 3 is a plot of sound pressure versus frequency for speech for a variety of conditions.

With reference to FIG. 3, the computer 102 stores a prestored profile 104 for each occupant that has performed the enrollment process described below with respect to a process 400. The prestored profile 104 can include a plurality of sound levels at a respective plurality of frequencies, represented in FIG. 3 as a curve (shown in solid line) plotted with frequency as the horizontal axis and sound level as the vertical axis. Frequency is measured in units of cycles per unit time, e.g., Hz, and sound level is measured in units of decibels (dB) or A-weighted decibels (dBA). The prestored profile 104 represents the typical sound levels for respective frequencies when the occupant speaks, i.e., the sound levels for respective frequencies when the occupant's voice is not affected by any conditions. The respective frequencies can be organized into octave bands, i.e., frequency bands in which the highest frequency for each band is twice the lowest frequency for that frequency band.

Different conditions can cause the occupant's voice to deviate from the prestored profile 104. Examples of conditions include when the occupant is sick, e.g., with a cold; when the occupant is wearing a mask; etc. For example, a deviant curve 122 is plotted in dotted lines in FIG. 3, which represents the sound levels of the occupant's voice for respective frequencies when the occupant is wearing a mask. Masks often have a small effect on volume when the frequency is 500 Hz or less and muffle sounds more considerably at 1000 Hz and higher to an extent that depends on the type of mask.

Figure 4:
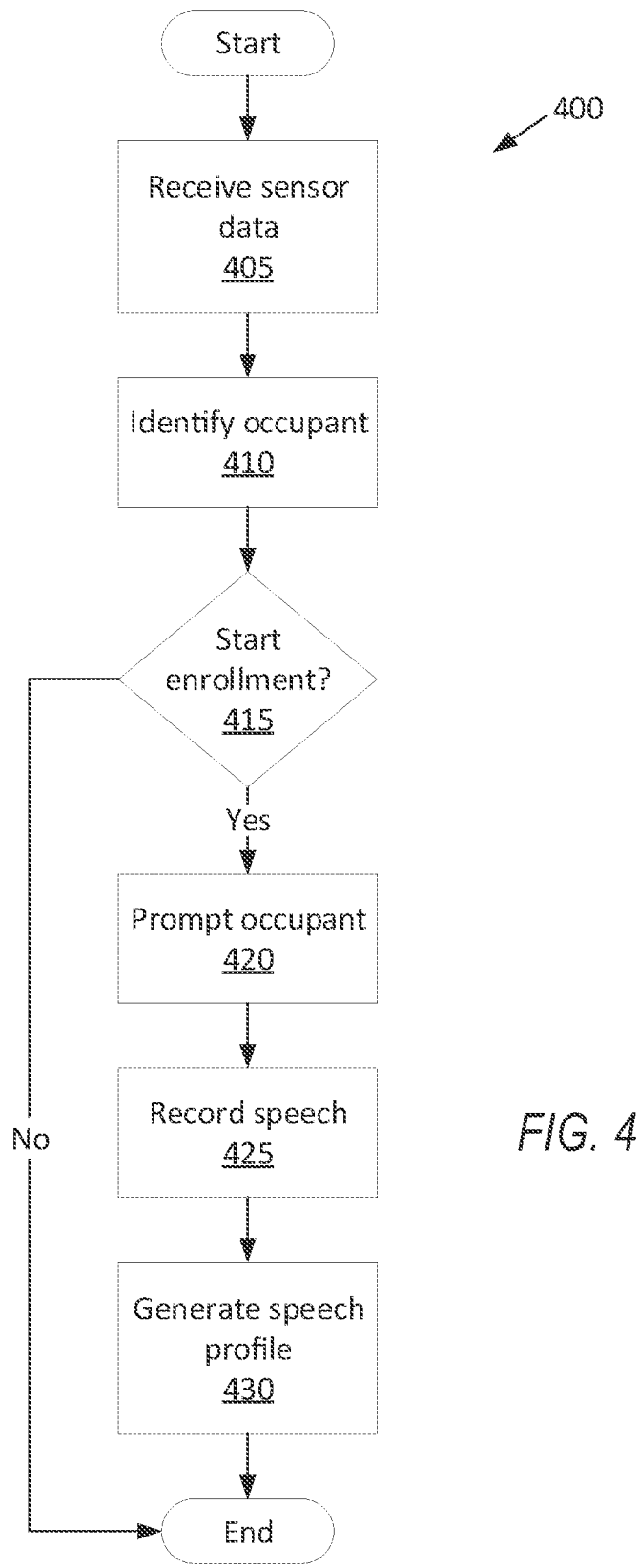
FIG. 4 is a process flow diagram of an example process for generating a profile of speech of an occupant of the vehicle.

FIG. 4 is a process flow diagram illustrating an exemplary process 400 for generating the prestored profile 104 for the occupant; this is referred to as enrollment of the occupant. The memory of the computer 102 stores executable instructions for performing the steps of the process 400 and/or programming can be implemented in structures such as mentioned above. As a general overview of the process 400, the computer 102 uses data to identify the occupant, and if the occupant wants to generate the prestored profile 104, the computer 102 prompts the occupant to say prestored text, makes a recording of the speech while the occupant says the prestored text, and generates the prestored profile 104 based on the recording.

The process 400 begins in a block 405, in which the computer 102 receives data of the occupant of the vehicle 100, e.g., image data from the camera 112 showing the occupant, or identifying data from the user interface 118.

Next, in a block 410, the computer 102 identifies the occupant. For example, the occupant can use a keyfob to start the vehicle 100, and the keyfob has an RFID tag or the like uniquely specifying the occupant from among other potential occupants who regularly use the vehicle 100. The RFID signal can be associated with the occupant in memory. For another example, a mobile phone or device of the occupant can pair with, e.g., the user interface 118 of the vehicle 100. The mobile phone or device can be associated with the occupant in memory. For another example, the computer 102 can use the data from the camera 112 having a field of view including a face of the occupant and can identify the occupant using image-recognition techniques as are known. For another example, the occupant can enter identifying information such as a username and password into the user interface.

Next, in a decision block 415, the computer 102 determines whether the occupant has chosen a command from the user interface 118 to generate the prestored profile 104, i.e., start an enrollment. If not, the process 400 ends. If so, the process 400 proceeds to a block 420.

In the block 420, the computer 102 provides a prompt to the occupant via the user interface 118 to say prestored text. For example, the user interface 118 can display the prestored text along with instructions to say the prestored text aloud. The prestored text can be one or more sentences or phrases chosen to collectively include a full range of frequencies, thus permitting the creation of the prestored profile 104 as shown in FIG. 3.

Next, in a block 425, the computer 102 makes the recording of the speech while the occupant speaks the prestored text, e.g., stores the data returned from the microphones 116 for a duration sufficiently long for the occupant to speak, i.e., say out loud, the prestored text.

Next, in a block 425, the computer 102 generates the prestored profile 104 based on the recording of speech by the occupant saying the prestored text. For example, the computer 102 can plot the sound levels, also called sound pressures, of the frequencies from the recording as a curve, i.e., a mathematical function P=F(f), i.e., sound pressure P as a function of a frequency f. For another example, the computer 102 can store the sound levels of the frequencies as a vector $P=<p_1, p_2, \ldots p_n>$, in which each entry $p_i$ is the sound level at a specific frequency, e.g., the sound level $p_1$ at 125 Hz, the sound level $p_2$ at 250 Hz, and so on up to the sound level $p_7$ at 8000 Hz. After the block 425, the process 400 ends.

Figure 5:
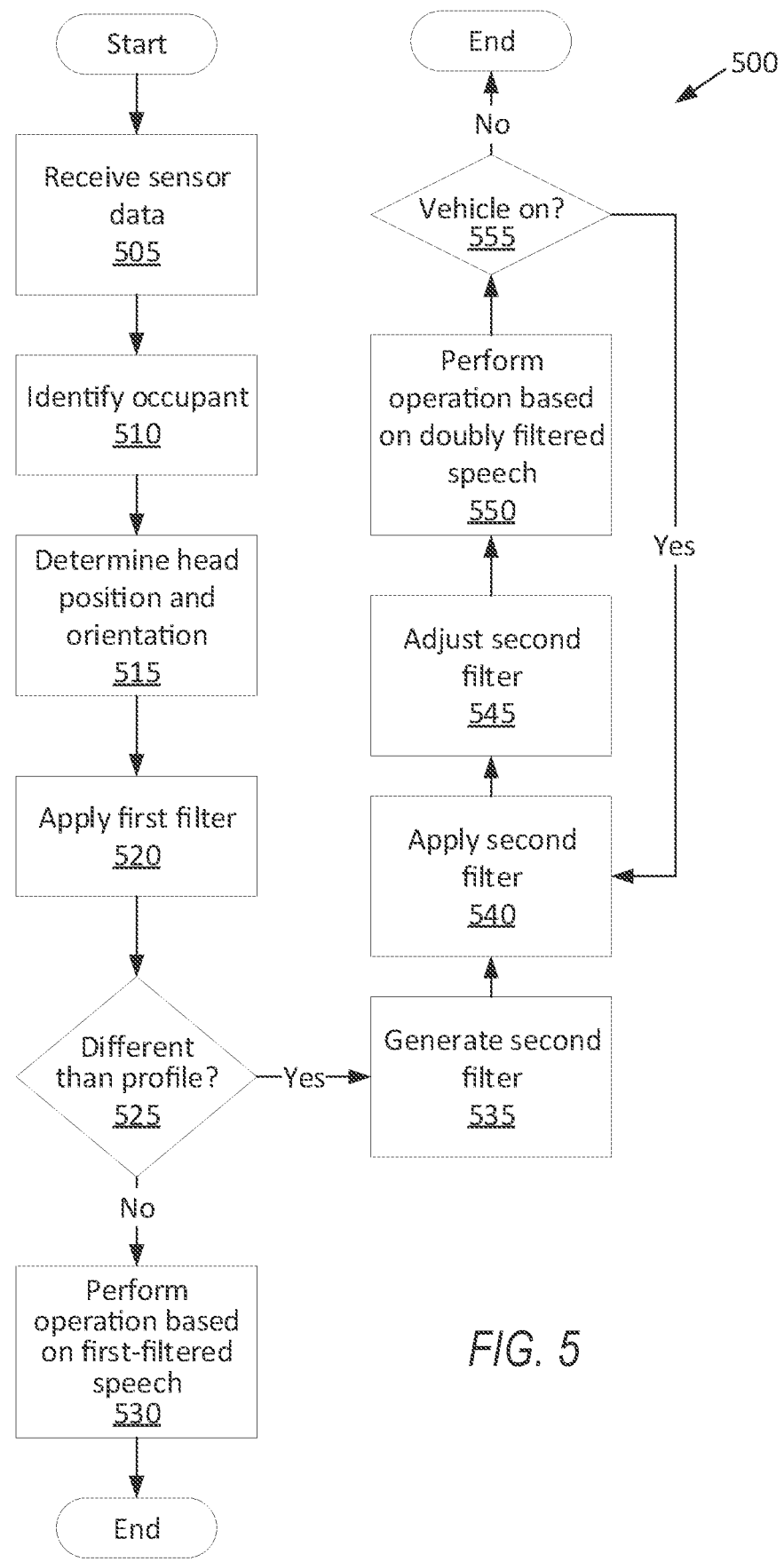
FIG. 5 is a process flow diagram of an example process for filtering speech of the occupant.

FIG. 5 is a process flow diagram illustrating an exemplary process 500 for filtering speech of the occupant. The memory of the computer 102 stores executable instructions for performing the steps of the process 500 and/or programming can be implemented in structures such as mentioned above. As a general overview of the process 500, the computer 102 uses data to identify the occupant, detects the position of the head of the occupant relative to the passenger cabin 106, and applies the first filter to the speech from the occupant based on the position of the head. If the speech is not different from the prestored profile 104 by at least a nonzero threshold, the computer 102 performs an operation using the speech filtered by the first filter but not the second filter. If the speech is different from the prestored profile 104 by at least the nonzero threshold, the computer 102 generates the second filter. Then for as long as the vehicle 100 remains on, the computer 102 repeatedly applies the second filter, adjusts the second filter based on a difference with the prestored profile 104, and performs the operation using the speech filtered by the first and second filters.

The process 500 begins in a block 505, in which the computer 102 receives data of the occupant of the vehicle 100, e.g., image data from the camera 112 showing the occupant, or identifying data from the user interface 118.

Next, in a block 510, the computer 102 identifies the occupant, as described above with respect to the block 410 of the process 400.

Next, in a block 515, the computer 102 detects a position as well as possibly an orientation of the head of the occupant relative to the passenger cabin 106. First, the computer 102 can detect the head in the image data from the camera 112, e.g., by using any suitable facial detection technique, e.g., knowledge-based techniques such as a multiresolution rule-based method; feature-invariant techniques such as grouping of edges, space gray-level dependence matrix, or mixture of Gaussian; template-matching techniques such as shape template or active shape model; or appearance-based techniques such as eigenface decomposition and clustering, Gaussian distribution and multilayer perceptron, neural network, support vector machine with polynomial kernel, naive Bayes classifier with joint statistics of local appearance and position, higher order statistics with hidden Markov model, or Kullback relative information. The output of the facial detection technique can include the orientation of the occupant's head. Second, with the head detected, the computer 102 can determine the position, e.g., by using pixel dimensions in a frame of the image data for a direction from the camera 112 and a size in, e.g., pixel width for a distance from the camera 112.

Next, in a block 520, the computer 102 selects the first filter according to the position and possibly also the orientation of the head from a plurality of stored filters stored in memory, and the computer 102 applies the selected first filter to speech from the occupant as detected by the microphones 116. The stored filters are determined by experimentally testing for sound distortions when the head of the occupant is in different positions and possibly orientations around the passenger cabin 106, and/or the stored filters can be determined using computer-aided engineering models of sound with a head of an occupant in different positions and possibly orientations in a model of the passenger cabin 106. The stored filters adjust sound levels of the speech by an amount that varies depending on frequency. Each stored filter specifies how much to adjust a sound pressure, i.e., volume, of sound data according to a frequency, e.g., each stored filter provides sound pressure as a mathematical function of frequency, $SP_1=F(f)$, in which $SP_1$ is sound pressure, F is the function of the stored filter, and f is frequency. The function F may be continuous or piecewise continuous, and the function F can be generated by fitting to experimental data. Alternatively, each stored filter can be represented as a vector $SP_1=<sp_1, sp_2, \ldots sp_n>$, in which each entry $sp_i$ is the sound level at a specific frequency, e.g., the sound level $sp_1$ at 125 Hz, the sound level $sp_2$ at 250 Hz, and so on up to the sound level $sp_7$ at 8000 Hz. For example, the stored filters can include a stored filter corresponding to when the occupant is in the driver seat 110 with the driver seat 110 in a position comparatively close to the instrument panel 114 and the head of the occupant comparatively low, a stored filter corresponding to when the occupant is in the driver seat 110 with the driver seat 110 in a position comparatively far from the instrument panel 114 and the head of the occupant comparatively high, and a stored filter corresponding to when the occupant is in the front passenger seat 110. The stored filters can also include a greater number of stored filters corresponding to more finely grained positions of the head of the occupant. For example, the stored filters can include different filters for different angles of the head of the occupant relative to the microphones 116. Selecting from the plurality of stored filters can provide a first filter that most accurately adjusts the speech to compensate for known distortions from the passenger cabin 106.

Next, in a decision block 525, the computer 102 determines whether the speech from the occupant differs from the prestored profile 104 by at least the nonzero threshold. The computer 102 determines the sound levels for a plurality of frequencies of the speech detected by the microphones 116, specifically the speech after being filtered by the first filter in the block 520. The speech can differ from the prestored profile 104 by at least the nonzero threshold when at least one of the sound levels in the prestored profile 104 differs from a sound level of the speech at the same frequency by at least a nonzero sound-level threshold. The nonzero sound-level threshold is measured in the same units as the sound levels of the prestored profile 104, and the nonzero sound-level threshold can be chosen by experiments to distinguish differences caused by a condition from differences caused by random fluctuations in the sound level. In response to the speech differing from the prestored profile 104 by at least the nonzero threshold, the process 500 proceeds to a block 535. In response to the speech differing from the prestored profile 104 by less than the nonzero threshold, the process 500 proceeds to a block 530.

In the block 530, the computer 102 performs an operation using the sound data filtered by the first filter but not the second filter. For example, the operation can be identifying a voice command to activate a feature, e.g., converting the sound data into text such as "Call Pizza Place," "Play Podcast," "Decrease Temperature," etc. (or into equivalent data identifying the command such as a code for the command). Using the sound data filtered by the first filter can help the computer 102 to accurately identify the voice command. For another example, the operation can be transmitting the sound data in a telephone call. A mobile phone can be paired with the user interface 118 and used to place a telephone call. Using the sound data filtered by the first filter can improve understanding by the recipient of the call of what the occupant is saying. For another example, the operation can be outputting the filtered sound data by one or more of the speakers 108. Sound data originating from the first microphone 116a can be used and outputted by the speaker 108 at a rear of the passenger cabin 106; in other words, the first microphone 116a and the speaker 108 form an in-vehicle intercom. Using the sound data filtered by the first filter can make it easier for an occupant in the back seat 110 to understand what the occupant in the front seat 110 is saying than directly hearing the occupant speaking with the condition. After the block 530, the process 500 ends.

In the block 535, the computer 102 generates the second filter. The second filter adjusts sound levels of the speech by an amount that varies depending on frequency. The second filter $SP_2$ can be mathematically represented in the same form as the first filter, as described above with respect to the block 520. The second filter can be a pass-through filter when generated; i.e., the sound level at each frequency is the same before and after being filtered by the second filter. As the second filter is adjusted below in a block 545, the second filter becomes no longer a pass-through filter. Alternatively, the second filter when generated can be based on data from a previous performance of the process 500 for the identified occupant.

Next, in a block 540, the computer 102 applies the second filter to speech from the occupant as detected by the microphones 116, e.g., to the speech after being filtered by the first filter in the block 520.

Next, in the block 545, the computer 102 adjusts the second filter based on a difference between the speech of the occupant filtered by the second filter and the prestored profile 104 of the occupant. As the computer 102 repeatedly performs the blocks 540 and 545, the computer 102 creates a feedback loop 600, which is described in more detail below with respect to FIG. 6. The adjustment of the second filter in this block 545 can thus be the adjustment described below with respect to the block 630 in the feedback loop 600.

Next, in a block 550, the computer 102 performs an operation using the sound data filtered by both the first filter and the second filter. For example, the operation can be identifying a voice command to activate a feature, e.g., converting the sound data into text such as "Call Pizza Place," "Play Podcast," "Decrease Temperature," etc. (or into equivalent data identifying the command). Using the sound data filtered by the first filter and the second filter can help the computer 102 to accurately identify the voice command. For another example, the operation can be transmitting the sound data in a telephone call. A mobile phone can be paired with the user interface 118 and used to place a telephone call. Using the sound data filtered by the first filter and the second filter can make it easy for the recipient of the call to understand what the occupant is saying. For another example, the operation can be outputting the filtered sound data by one or more of the speakers 108. Sound data originating from the first microphone 116a can be used and outputted by the speaker 108 at a rear of the passenger cabin 106; in other words, the first microphone 116a and the speaker 108 form a telecom. Using the sound data filtered by the first filter and the second filter can make it easier for an occupant in the back seat 110 to understand what the occupant in the front seat 110 is saying than directly hearing the occupant speaking with the condition.

Next, in a decision block 555, the computer 102 determines whether the vehicle 100 is still on. If the vehicle 100 is still on, the process 500 returns to the block 540, so the blocks 540, 545, and 550 are performed repeatedly during a single trip of the vehicle 100, creating the feedback loop 600 described below with respect to FIG. 6. If the vehicle 100 has been turned off, the process 500 ends.

Figure 6:
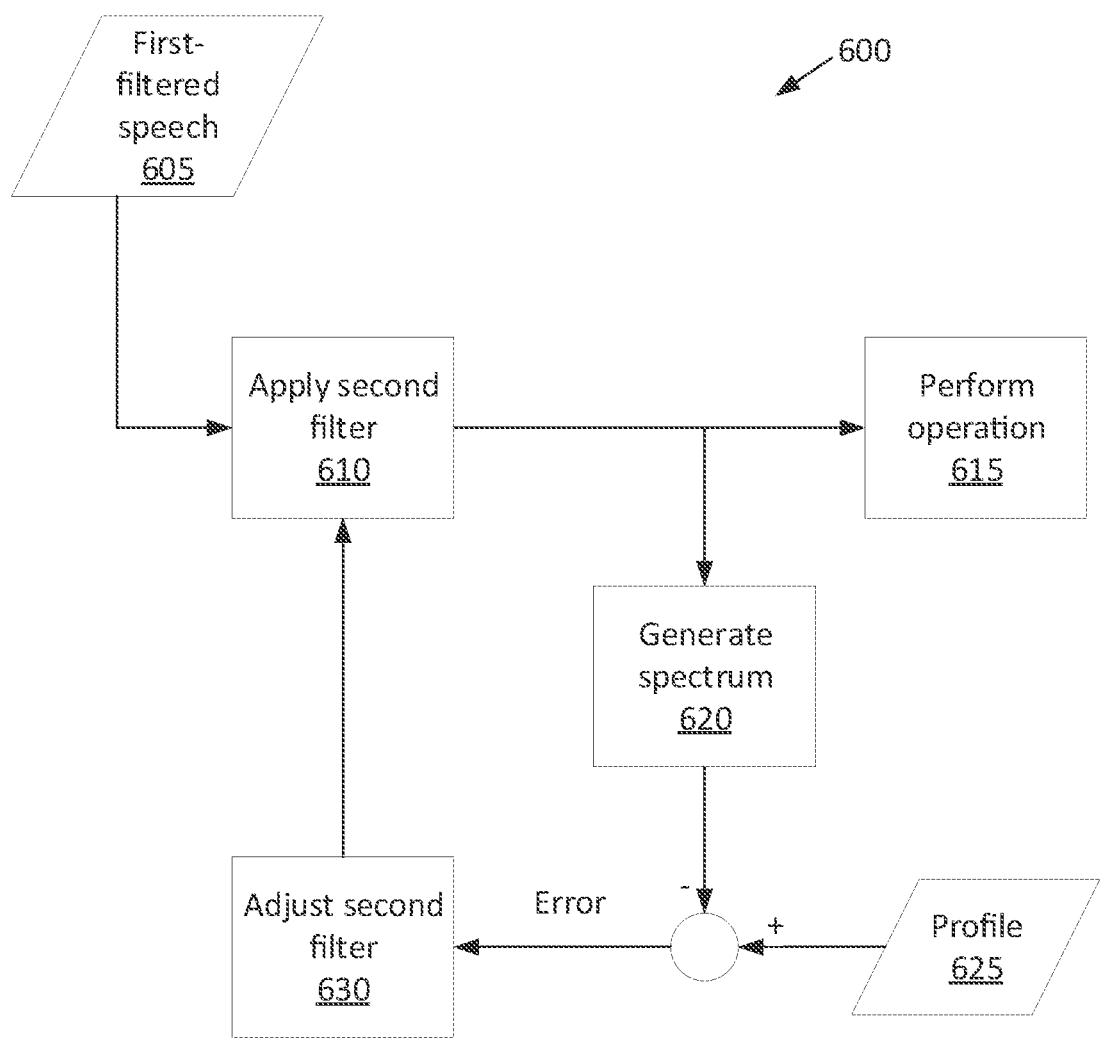
FIG. 6 is an information flow diagram of a feedback loop for adjusting a second filter for filtering speech of the occupant.

FIG. 6 is an information flow diagram illustrating the feedback loop 600 for adjusting the second filter. The memory of the computer 102 stores executable instructions for enacting the feedback loop 600 and/or programming can be implemented in structures such as mentioned above. As a general overview of the feedback loop 600, the computer 102 applies the second filter to the speech filtered by the first filter, which is used to perform the operation and to generate a spectrum, i.e., sound levels at different frequencies of the speech filtered by the first filter and second filter. The computer 102 determines an "error," i.e., difference, between the prestored profile 104 and the spectrum. The computer 102 uses the error to adjust the second filter before again applying the second filter to complete the feedback loop 600.

In a block 610, the computer 102 applies the second filter to the speech filtered by the first filter, as described above with respect to the block 540. The speech filtered by the first filter is represented by an information block 605 flowing into the block 610. The second filter can be a pass-through filter for the first iteration of the feedback loop 600, and the second filter is received from a block 630 thereafter. The speech filtered by the first filter and the second filter flows to a block 615, in which the computer 102 performs the operation as described above with respect to the block 550, and to a block 620.

In the block 620, the computer 102 generates the spectrum using the speech filtered by the first filter and the second filter. The spectrum represents how the sound level of the speech filtered by the first filter and the second filter varies with frequency. The spectrum can be represented mathematically in the same form as the second filter. The spectrum can be represented as sound level as a mathematical function of frequency, $S=F(f)$, in which S is sound level, F is the mathematical function, and f is frequency. Alternatively, the spectrum can be represented as a vector $S=<s_1, s_2, \ldots s_n>$, in which each entry $s_i$ is the sound level at a specific frequency, e.g., the sound level $s_1$ at 125 Hz, the sound level $s_2$ at 250 Hz, and so on up to the sound level $s_7$ at 8000 Hz.

The error is the difference between the prestored profile 104, shown as an information block 625, and the spectrum flowing from the block 620, i.e., $E=P-S$, in which P is the prestored profile 104 and S is the spectrum. If the prestored profile 104 and the spectrum are represented as mathematical functions $P=F_1(f)$ and $S=F_2(f)$, then the error is a function $E=F_1(f)-F_2(f)$. If the prestored profile 104 and the spectrum are represented as vectors $P=<p_1, p_2, \ldots p_n>$ and $S=<s_1, s_2, \ldots s_n>$, then the error is a vector $E=<p_1, p_2, \ldots p_n>-<s_1, s_2, \ldots s_n>=<p_1-s_1, p_2-s_2, p_n-s_n>$. The error E flows into the block 630.

In the block 630, the computer 102 adjusts the second profile based on the error, i.e., based on the difference between the speech of the occupant filtered by the second filter and the prestored profile 104 of the occupant. For each frequency, the previous compensation in the second filter is changed by the error at that frequency; e.g., if the second filter increases the sound level by 8 dBA at 2000 Hz and the error is 2 dBA, the second filter is adjusted to instead increase the sound level by 10 dBA at 2000 Hz. The adjusted second filter flows from the block 630 to the block 610 to complete the feedback loop 600.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   identify an occupant in a passenger cabin of a vehicle;
   detect a position of a head of the occupant relative to the passenger cabin;
   apply a first filter to speech from the occupant based on the position of the head;
   generate a second filter, wherein, when the second filter is generated for the first time during a trip of the vehicle, the second filter returns a sound level at each of a respective plurality of frequencies that is the same before and after being filtered by the second filter;
   repeatedly during the trip of the vehicle:
      (a) detect the speech by the occupant;
      (b) then apply the second filter to the speech; and
      (c) then adjust the second filter based on a difference between the speech of the occupant filtered by the second filter and a prestored profile of the occupant; and
   perform an operation using the speech filtered by the first filter and the second filter.

2. The computer of claim 1, wherein generating the second filter occurs in response to the speech differing from the prestored profile by at least a nonzero threshold.

3. The computer of claim 2, wherein the instructions include instructions to, in response to the speech differing from the prestored profile by less than the nonzero threshold, perform the operation using the speech filtered by the first filter.

4. The computer of claim 2, wherein the prestored profile includes a plurality of the sound levels at a respective plurality of the frequencies, and the speech differs from the prestored profile by at least the nonzero threshold when at least one of the sound levels in the prestored profile differs from a sound level of the speech at the same frequency by at least a nonzero sound-level threshold.

5. The computer of claim 1, wherein the instructions to apply the first filter include instructions to select the first filter according to the position of the head from a plurality of filters stored in memory.

6. The computer of claim 1, wherein the instructions include instructions to generate the prestored profile based on a recording of speech by the occupant.

7. The computer of claim 6, wherein the instructions include instructions to provide a prompt to the occupant to say prestored text, and to make the recording of the speech while the occupant says the prestored text.

8. The computer of claim 1, wherein the instructions to apply the second filter to the speech include instructions to apply the second filter to the speech filtered by the first filter.

9. The computer of claim 1, wherein the second filter adjusts the sound levels of the speech by an amount that varies depending on frequency.

10. The computer of claim 1, wherein the first filter adjusts the sound levels of the speech by an amount that varies depending on frequency.

11. The computer of claim 1, wherein the operation is identifying a voice command to activate a feature.

12. The computer of claim 1, wherein the operation is transmitting the speech filtered by the first filter and the second filter in a telephone call.

13. The computer of claim 1, wherein the operation is outputting the speech filtered by the first filter and the second filter by a speaker of the vehicle.

14. The computer of claim 1, wherein applying the second filter to the speech includes applying the second filter to the speech after being filtered by the first filter.

15. A method comprising:
   identifying an occupant in a passenger cabin of a vehicle;
   detecting a position of a head of the occupant relative to the passenger cabin;
   applying a first filter to speech from the occupant based on the position of the head;
   generating a second filter, wherein, when the second filter is generated for the first time during a trip of the vehicle, the second filter returns a sound level at each of a respective plurality of frequencies that is the same before and after being filtered by the second filter;
   repeatedly during the trip of the vehicle:
      (a) detecting the speech by the occupant;
      (b) then applying the second filter to the speech; and
      (c) then adjusting the second filter based on a difference between the speech of the occupant filtered by the second filter and a prestored profile of the occupant; and
   performing an operation using the speech filtered by the first filter and the second filter.

16. The method of claim 15, wherein generating the second filter occurs in response to the speech differing from the prestored profile by at least a nonzero threshold.

17. The method of claim 15, wherein applying the first filter includes selecting the first filter according to the position of the head from a plurality of filters stored in memory.

* * * * *